(12) United States Patent
    Sanders

(10) Patent No.: US 10,876,671 B2
(45) Date of Patent: Dec. 29, 2020

(54) LINER

(71) Applicant: Simon Sanders, Salisbury (GB)

(72) Inventor: Simon Sanders, Salisbury (GB)

(*) Notice: Subject to any disclaimer, the term of this patent is extended or adjusted under 35 U.S.C. 154(b) by 85 days.

(21) Appl. No.: 16/304,648

(22) PCT Filed: May 26, 2017

(86) PCT No.: PCT/GB2017/051502
    § 371 (c)(1),
    (2) Date: Nov. 26, 2018

(87) PCT Pub. No.: WO2017/203277
    PCT Pub. Date: Nov. 30, 2017

(65) Prior Publication Data
    US 2019/0301658 A1    Oct. 3, 2019

(30) Foreign Application Priority Data

May 27, 2016   (GB) .................................. 1609435.1

(51) Int. Cl.
    *F16L 55/165*    (2006.01)
    *F16L 55/18*     (2006.01)
(52) U.S. Cl.
    CPC ........ *F16L 55/1654* (2013.01); *F16L 55/1651* (2013.01); *F16L 55/18* (2013.01)
(58) Field of Classification Search
    CPC .............. F16L 55/1651; F16L 55/1654; F16L 55/1656; F16L 55/1645; F16L 55/18
    USPC ....... 138/98, 97; 405/184.2, 150.1; 156/187, 156/292
    See application file for complete search history.

(56) References Cited

U.S. PATENT DOCUMENTS

| 5,765,597 | A |   | 6/1998 | Kiest, Jr. et al. |
| 5,855,729 | A | * | 1/1999 | Kiest, Jr. ................. B29C 63/36 156/287 |
| 5,964,249 | A |   | 10/1999 | Kiest, Jr. |
| 6,021,815 | A | * | 2/2000 | Kiest, Jr. ................. B29C 63/36 138/97 |
| 6,199,591 | B1 | * | 3/2001 | Kiest, Jr. ................. B29C 63/36 138/97 |
| 6,206,993 | B1 | * | 3/2001 | Kiest, Jr. ................. B29C 63/36 156/156 |
| 6,701,966 | B1 | * | 3/2004 | Higman .............. F16L 55/1651 138/97 |

(Continued)

FOREIGN PATENT DOCUMENTS

| GB | 2466385 A | 6/2010 |
| WO | 2010070299 A1 | 6/2010 |

OTHER PUBLICATIONS

International Preliminary Report on Patentability dated Dec. 6, 2018 from counterpart international application No. PCT/GB2017/051502, 13 pp.

(Continued)

*Primary Examiner* — Patrick F Brinson
(74) *Attorney, Agent, or Firm* — Shumaker & Sieffert, P.A.

(57) ABSTRACT

A liner for insertion into a pipe is described, said liner comprising a continuous tubular construction which is capable of eversion, the liner further comprising a deformation portion, a detachable connection between components of the liner and at least one load transfer member. A method of installing a liner in a pipe to be lined is also described.

34 Claims, 9 Drawing Sheets

(56) References Cited

U.S. PATENT DOCUMENTS 7,845,372 B2 * 12/2010 Kiest, Jr. ............... F16L 55/179
138/98
2008/0236692 A1    10/2008  Kiest
2015/0151484 A1     6/2015  Sanders

OTHER PUBLICATIONS

Search Report under Section 17 dated Nov. 18, 2016 from counterpart GB Application No. 1609435.1, 4 pp.
International Search Report and Written Opinion dated Jul. 5, 2017 from counterpart international application No. PCT/GB2017/051502, 15 pp.

* cited by examiner

LINER

This application is a national stage application under 35 U.S.C. § 371 of PCT Application No. PCT/GB2017/051502, filed May 26, 2017, which claims the benefit of Great Britain Application No. 1609435.1, filed May 27, 2016. The entire contents of each of PCT Application No. PCT/GB2017/051502 and Great Britain Application No. 1609435.1 are incorporated herein by reference in their entirety.

FIELD OF THE INVENTION

The present invention relates to a liner for insertion into a pipe, and more particularly to a pipe liner forming a continuous tubular construction which is capable of eversion.

BACKGROUND TO THE INVENTION

It is common to repair defective pipes, especially those carrying fluids, with the insertion of a liner. Such liners typically comprise a combination of materials that enable the liner to be flexible as it is inserted, whilst simultaneously allowing the liner to harden once it has been positioned in the pipe to be lined. The most common type of liner is a cured in place pipe liner (CIPP liner), comprising an elongate tube of a flexible material such as felt. This flexible material is impregnated with a resin which hardens, or may be caused to harden, once the liner is inserted into a pipe. Depending on the resin or resins used, this hardening process may occur under atmospheric conditions or under the influence of heat or steam.

When positioning the liner in a pipe to be lined, it is common to place the liner inside the diameter of the pipe and evert it, such that what was previously the external surface of the liner forms the interior surface of the liner. Eversion is most usually achieved by positioning the end of the liner so that it passes through a nozzle and is turned back over and fastened in place round the nozzle so that, when fluid such as air or water is introduced under pressure through the nozzle, the liner may be caused to progressively evert along its length as it passes through the nozzle. The everting end of the liner may be inserted in the end of a pipe, and the continuing application of fluid under pressure causes the liner to evert and extend into the pipe.

Once the liner is fully inserted it is held in position in the pipe to be lined by maintaining pressure within it, which requires provision for the distal end of the liner to be closed to retain the pressurising fluid, or by means of a length of pressurisable tubing, often inserted into the pipe alongside the liner.

However, this method of installing a pipe liner is not without its disadvantages. Firstly, an everted liner installed using the aforementioned method must extend from a point of access to the pipe being lined, often remote from the area which requires repair. It is not possible for the liner to start at a chosen point within the pipe, such as beyond a junction between two or more pipes. Secondly, part of the cured liner will always project from the access end of the pipe being lined and any excess liner must be trimmed, alongside the removal of all spillage and contamination. Thirdly, existing methods for pressurising an everted liner frequently require an operator to enter a manhole and be present for the lining operation. Pressurising an everted liner may be undertaken by closing the distal end or by the use of an inversion hose.

The aforementioned problems are considered in EP 2,379,932. This application focuses on increasing the ease of installation of a pipe liner by providing a method, using an extender tube and a liner tube, which allows the liner to be placed at specific, desired locations inside a pipe. In this way, the costs of lining a pipe are reduced due to an increased ease of installation and a reduction in waste materials. Furthermore, the ability to line specific sections of pipe reduces the difficulties associated with lining complex piping system with junctions between multiple pipes.

However, whilst EP 2,379,932 provides a contribution to the state of the art in this area of technology, it does not provide the perfect solution. In the method contained within EP 2,379,932, the connection between the liner tube and the extender tube is located inside the pipe to be lined, potentially a significant distance from those involved in the lining process.

Using the technology disclosed in EP 2,379,932, combined liner and extender tubes are limited to small diameters (100 mm) where the liner tube has been impregnated with a polyester resin, a material that cures exothermically while emitting a styrene vapour. Heat from the curing process and the solvent properties of the styrene vapour have been found to weaken adhesives used to join the liner and the extender tube and, as such, at these small diameters it is possible to detach the extender tube with the application of a force on the extender tube.

However, the method described in EP 2,379,932 is less suitable where other resins are used in the liner tube, and the curing process of these resins does not weaken the adhesive bond between the liner tube and the extender tube. Additionally, even if a polyester resin is used, this method is problematic at larger pipe diameters.

Alternative methods are available, including the use of solvents, heat, peeling forces or mechanically destructive actions. However, such methods are frequently difficult to apply, especially where the join between the extender tube and the liner tube is remote from the point of access.

SUMMARY OF THE INVENTION

According to a first aspect of the present invention, there is provided a liner for insertion into a pipe, said liner comprising; an extender tube, a connector tube, and a liner tube, a first end of said extender tube forming a substantially fluid tight connection with a first end of said connector tube to form a first connection, a second end of said connector tube forming a substantially fluid tight, detachable connection with a first end of said liner tube to form a second connection, said extender tube, connector tube and liner tube forming a continuous tubular construction which is capable of eversion, wherein said liner further comprises at least one load transfer member, a first end of said load transfer member attached to said extender tube at a first attachment point, a second end of said load transfer member attached to said connector tube at a second attachment point, wherein said connector tube further comprises a deformation portion located between said first connection and said second attachment point.

In this way, there is provided apparatus for lining a pipe wherein this apparatus allows a liner tube to be placed at a desired position in a piper to be lined, and the subsequent removal of all aspects of the liner not required after the pipe lining or repair has been completed.

The provision of a load transfer member allows the connector tube to be removed from the liner tube more easily, by ensuring any force applied to the pipe liner after curing of the liner tube is transferred to the second connection after the rupture, damage or extension of the deformation portion. The ability of the user to apply a force more directly to the second connection provides for an increase in the ease of installation of the pipe liner, by facilitating the separation of the connector tube from the liner tube at the second connection.

Preferably, the deformation portion is frangible. More preferably, the deformation portion is frangible under a force, the force preferably provided by the user. Preferably the force is a tensile stress, a shear stress, or a combination of the two.

Preferably the deformation portion is extensible. More preferably, the deformation is extensible under a force, the force preferably exerted by the user. Preferably the force is a tensile stress, a shear stress, or a combination of the two. Preferably the deformation portion is extensible such that its further extension is restricted by the load transfer member.

Preferably the deformation portion forms a ring or annulus around the circumference of the connector tube. Preferably the deformation portion extends continuously around the connector tube.

Preferably, the second attachment point is proximal to the second connection. More preferably, the second attachment point is in communication with the second connection. Most preferably, the second attachment point is in contact with the second connection.

Preferably, the second attachment point is integrated within the second connection. More preferably, the second attachment point is sandwiched between the connector tube and the liner tube. More preferably, the second attachment point is continuous with the second connection. Preferably, the second attachment point is located on an inner surface of the connector tube.

Preferably, the load transfer member has a length greater than the distance between the first attachment point and the second attachment point. More preferably, the connector has a length of at least 110% of the distance between the first attachment point and the second attachment point.

Preferably, the first attachment point is located proximal to the first connection.

Preferably, the load transfer member is flexible. Preferably, the load transfer member is inextensible.

Preferably, the extender tube is reusable. Preferably, the first connection is detachable. Preferably, the connection between the connector tube and the liner tube at the first connection uses a reusable adhesive.

Preferably, the attachment between the load transfer member and the extender tube at the first connection point is frangible. Preferably, the attachment between the load transfer member and the extender tube at the first connection point uses adhesive. More preferably, the attachment between the load transfer member and the extender tube at the first connection point uses reusable adhesive.

According to a second aspect of the present invention there is provided a method of lining a pipe, comprising everting the combined extender tube, connector tube and liner tube such that said liner tube becomes positioned at a desired position in a pipe being lined, applying a first force to said extender tube, said first force transmitted along said extender tube to deform the deformation portion, applying a second force to said extender tube, said second force transmitted along said extender tube and along at least one load transfer member to the second attachment point, detaching said connector tube from said liner tube at the second connection using said second force, and removing said extender tube, said connector tube and said load transfer member from the pipe.

In this way, a method of installing a pipe liner, whereby only the liner remains in the pipe after installation, is provided Preferably, the method further comprises everting the combined extender tube, connector tube and liner tube using fluid under pressure. Preferably, this fluid is compressed air.

Preferably, the application of the first force extends continuously into the application of the second force. Preferably, the first force places the deformation portion under tensile stress. Preferably, the second force places the load transfer member under tensile stress. Preferably, the second force exerts a peeling force on the second connection.

Preferably, the method further comprises the step of curing the liner tube.

According to a third aspect of the present invention, there is provided a liner for insertion into a pipe, said liner comprising; an extender tube, and a liner tube, a first end of said extender tube forming a substantially fluid tight seal with a first end of connector tube to form a frangible connection, said extender tube and said liner tube forming a continuous tubular construction which is capable of eversion, wherein said liner further comprises at least one load transfer member, a first end of said load transfer member attached to said extender tube at a first attachment point, a second end of said load transfer member attached to said extender tube at a second attachment point, said second attachment point being closer to said frangible connection than said first attachment point, wherein said extender tube further comprises a deformation portion located between said first attachment point and said second attachment point.

Preferably, the deformation portion is frangible. More preferably, the deformation portion is frangible under a force, the force preferably provided by the user. Preferably the force is a tensile stress, a shear stress, or a combination of the two.

Preferably the deformation portion is extensible. More preferably, the deformation is extensible under a force, the force preferably exerted by the user. Preferably the force is a tensile stress, a shear stress, or a combination of the two. Preferably the deformation portion is extensible such that its further extension is restricted by the load transfer member.

Preferably the deformation portion forms a ring or annulus around the circumference of the connector tube. Preferably the deformation portion extends continuously around the connector tube.

Preferably, the second attachment point is integrated within the frangible connection. More preferably, the second attachment point is sandwiched between the extender tube and the liner tube. More preferably, the second attachment point is continuous with the frangible connection.

Preferably, the load transfer member has a length greater than the distance between the first attachment point and the second attachment point. More preferably, the connector has a length of at least 110% of the distance between the first attachment point and the second attachment point.

Preferably, the load transfer member is flexible. Preferably, the load transfer member is inextensible.

According to fourth aspect of the present invention, there is provided a method of lining a pipe, comprising everting the combined extender tube and liner tube such that said liner tube becomes positioned at a desired position in a pipe being lined, applying a first force to said extender tube, said first force transmitted along said extender tube to deform the deformation portion, applying a second force to said extender tube, said second force transmitted along said extender tube and along at least one load transfer member to the second attachment point, detaching said extender tube from said liner tube at the frangible connection using said second force, and removing said extender tube and said load transfer member from the pipe.

Preferably, the method further comprises everting the combined extender tube, connector tube and liner tube using fluid under pressure. Preferably, this fluid is compressed air.

Preferably, the application of the first force extends continuously into the application of the second force. Preferably, the first force places the deformation portion under tensile stress. Preferably, the second force places the load transfer member under tensile stress. Preferably, the second force exerts a peeling force on the frangible connection.

Preferably, the method further comprises the step of curing the liner tube.

According to a fifth aspect of the present invention, there is provided a connector tube which is capable of eversion, comprising a first end for forming a first fluid tight connection with a second tube, a second end for forming a second fluid tight connection with a third tube, said connector tube further comprising at least one load transfer member, a first end of said load transfer member attached to said connector tube at a first attachment point, said connector tube further comprising a deformation portion. In this way, the connector tube, second tube and third tube may form a continuous tubular construction which is capable of eversion and is substantially air tight.

Here, the load transfer members are flexible and inextensible. Additionally, the first end of the load transfer members may be attached to the connector tube such that they are proximate one end of the connector tube. It may be preferable for at least one of the ends of the connector tube to comprise an adhesive, more preferably a reusable adhesive. Preferably, the deformation portion may comprise a peel weld, a line of indentations or a scored line. It may be preferred that the connector tube is made of a plastic material, more specifically a plastic which is sufficiently supple to allow the tube to evert. Additionally, the deformation portion may form a ring or an annulus.

According to a sixth aspect of the present invention, there is provided method of lining a pipe, as hereinbefore described with reference to the accompanying drawings.

According to a seventh aspect of the present invention, there is provided apparatus for lining a pipe, as hereinbefore described with reference to the accompanying drawings.

DETAILED DESCRIPTION

Embodiments of the present invention will now be described by way of example only and with reference to the accompanying drawings, in which.

Figure 1:
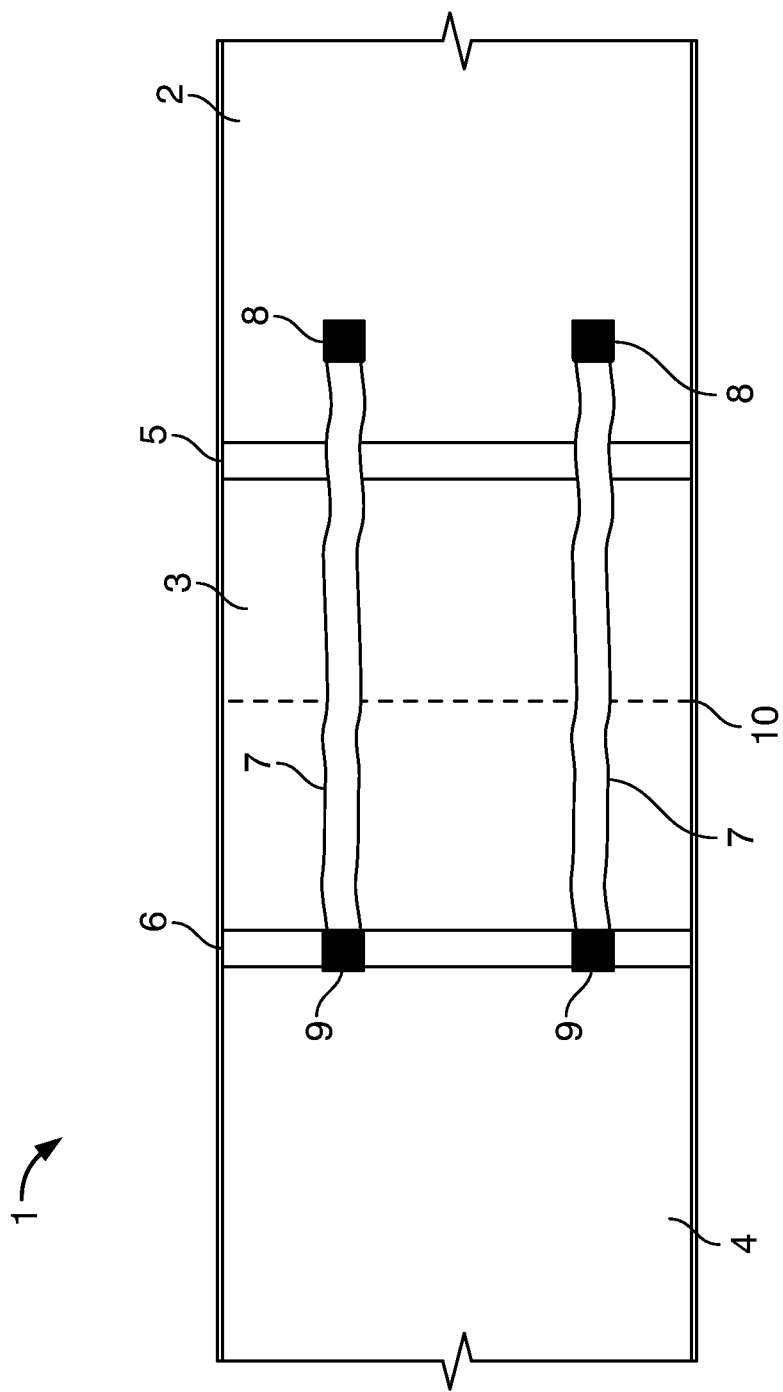
FIG. 1 is a top view of the exterior of a first embodiment of a pipe liner in accordance with the present invention.

Referring to FIG. 1 of the drawings, there is shown the exterior of a pipe liner 1 in accordance with the present invention. Here the pipe liner comprises an extender tube 2, a connector tube 3 and a liner tube 4. Each respective tube is elongate and has an annular cross section, with the radius of this cross section being substantially equal for each respective tube. Whilst the radius of each tube is substantially equal, here the extender tube 2 and the liner tube 4 have a radius that is slightly larger than the radius of the connector tube 3, to allow the pipe liner 1 to be assembled from these component parts.

The radius of each tube is substantially equal along its length. Whilst the radius of each tube is substantially equal along is length, any tube may include a tapered change in its radius that allows the pipe liner 1 to be assembled from its component parts. The liner tube 4 comprises non-woven polyester needle felt impregnated with a curable resin, whilst the connector tube 3 and extender tubes comprise flexible plastics such as PVC, polyurethane and polyethylene. Each tube also comprises a skin, this skin forming the outer surface of the tube.

A first end of the extender tube 2 is connected to a first end of the connector tube 3, to form a first connection 5. This first connection 5 extends around the entire circumference of the annular cross section of the tubes, and is formed by affixing the inside surface of the first end of the connector tube 3 to the exterior surface of the first end of the extender tube 2. In this way, the extender tube 2 and connector tube 3 overlap at the first connection 5, the circumferences of the extender tube 2 and the connector tube 3 forming concentric circles, the circle formed by the circumference of the connector tube 3 lying outside the circle formed by the circumference of the extender tube 2. The affixation of the extender tube 2 and the connector tube 3 at the first connection 5 is undertaken using an adhesive, although a plastic weld may be preferred.

A second end of the connector tube 3 is connected to a first end of the liner tube 4 at a second connection 6. Similarly to the first connection 5, the second connection 6 extends around the entire circumference of the annular cross section of the tubes and is formed by affixing the inside surface of the second end of the connector tube 3 to the exterior surface of the first end of the liner tube 4. In this way, the liner tube 4 and connector tube 3 overlap at the second connection 6, the circumferences of the liner tube 4 and the connector tube 3 forming concentric circles, the circle formed by the circumference of the connector tube 3 lying outside the circle formed by the circumference of the liner tube 4.

The affixation of the liner tube 4 and the connector tube 3 at the second connection 6 is undertaken using an adhesive. Here, the affixation provided by the adhesive at the second connection 6 provides sufficient strength to prevent the facile, accidental detachment of the connector tube 3 from the liner tube 4, but also allows for the second connection 6 to be broken if a substantive force is purposively applied.

Both the first connection 5 and the second connection 6 are substantially fluid tight, preventing the loss of gas, or any other fluid, through the connection itself.

Referring still to FIG. 1, it can be seen that the extender tube 2, the connector tube 3 and the liner tube 4 are joined to form a continuously tubular construction. This continuous tube is capable of eversion, namely it can be turned inside out in a progressive process beginning at one end of the continuously tubular construction, the process then progressing along the length of the continuous tube. The process of eversion may be undertaken with compressed gas or another fluid to progressively evert the liner in a manner such that the extender tube 2 is the first to evert, followed by the connector tube 3 and the liner tube 4.

This first embodiment of the pipe liner further comprises load transfer members 7. A first end of each load transfer member 7 is connected to the extender tube 2 at a first attachment point 8, and a second end of each load transfer member 7 is attached to the connector tube 3 at a second attachment point 9. Here, the first attachment points 8 are spaced evenly around the circumference of the extender tube 2, and are located proximal to the first connection 5.

Additionally, the second attachment points 9 are spaced evenly around the circumference of the connector tube 3. The second attachment points 9 are located on the exterior surface of the connector tube 3, opposing the joint between the connector tube 3 and the liner tube 4 that forms the second connection 6.

Each load transfer member 7 is flexible, inextensible, and has a length greater than the distance between the first attachment point 8 and the second attachment point 9. In this way, each load transfer member 7 may fall away from the exterior surface of the continuously tubular construction, and remains slack when the continuously tubular construction remains in one piece.

The connector tube further comprises a deformation portion 10, located between the first connection and the second attachment points. Here, the deformation portion 10 is located centrally on the connector tube 3, and consists of a plastic weld, more specifically a peel weld. This peel weld is frangible, and may be broken or disrupted with the application of a tensile stress along the longitudinal axis of the connector tube 3, or the pipe liner 1 as a whole. The deformation portion 10 extends around the circumference of the connector tube 3 to form a ring, allowing the disruption and rupture of the connector tube 3 around its complete circumference.

Figure 2:
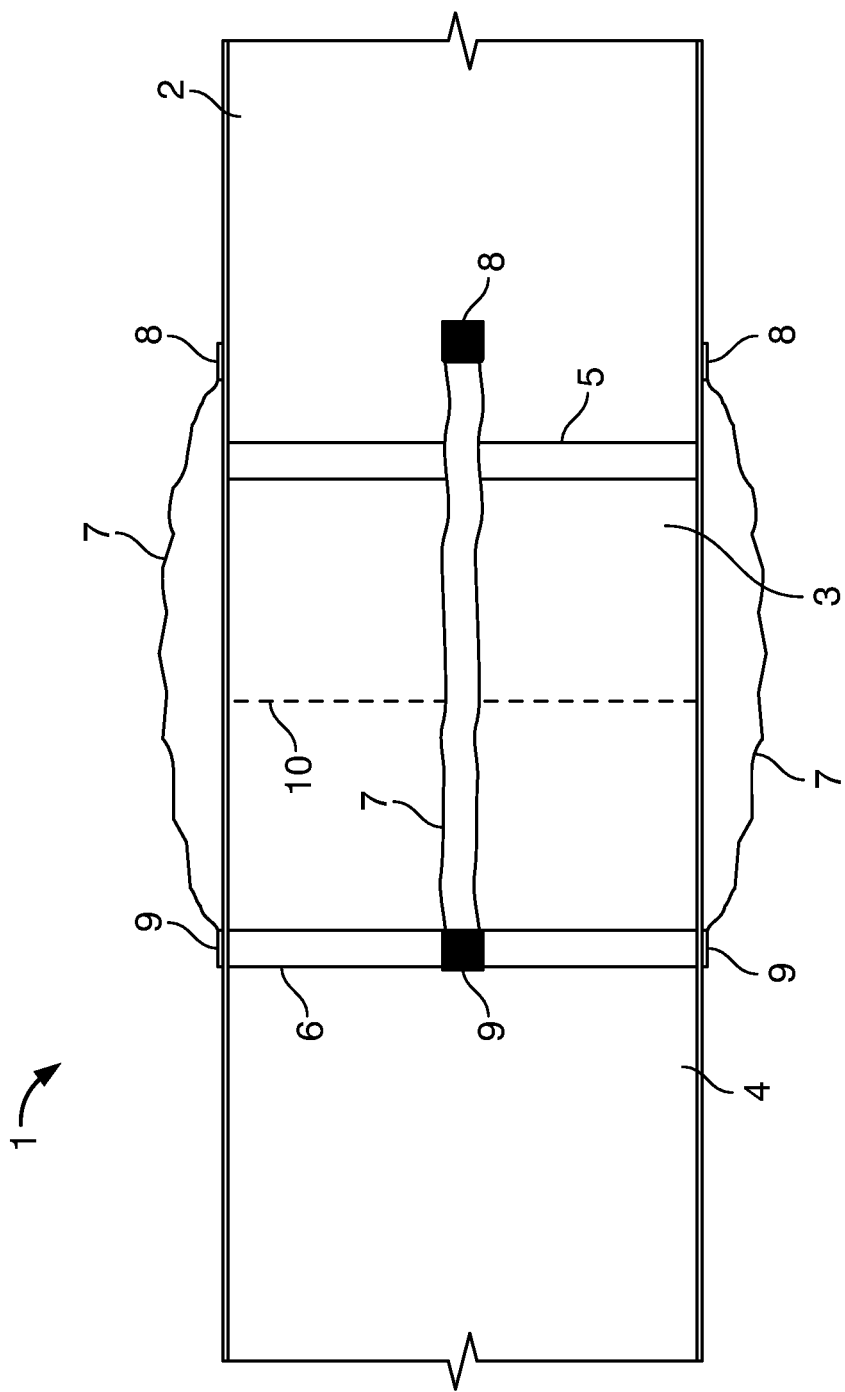
FIG. 2 is a side view of a first embodiment of a pipe liner in accordance with the present invention.

FIG. 2 depicts a side view of the liner illustrated in FIG. 1, and is therefore marked with the appropriate reference numerals. FIG. 2 further illustrates the even spacing of the first attachment points 8 and second attachment points 9 around the circumference of the pipe liner 1. Additionally, FIG. 2 illustrates the length of the load transfer members 7 being greater than the distance between the first attachment points 8 and the second attachment points 9, allowing the load transfer members 7 to lie away from the sides of the pipe liner 1.

Figure 3:
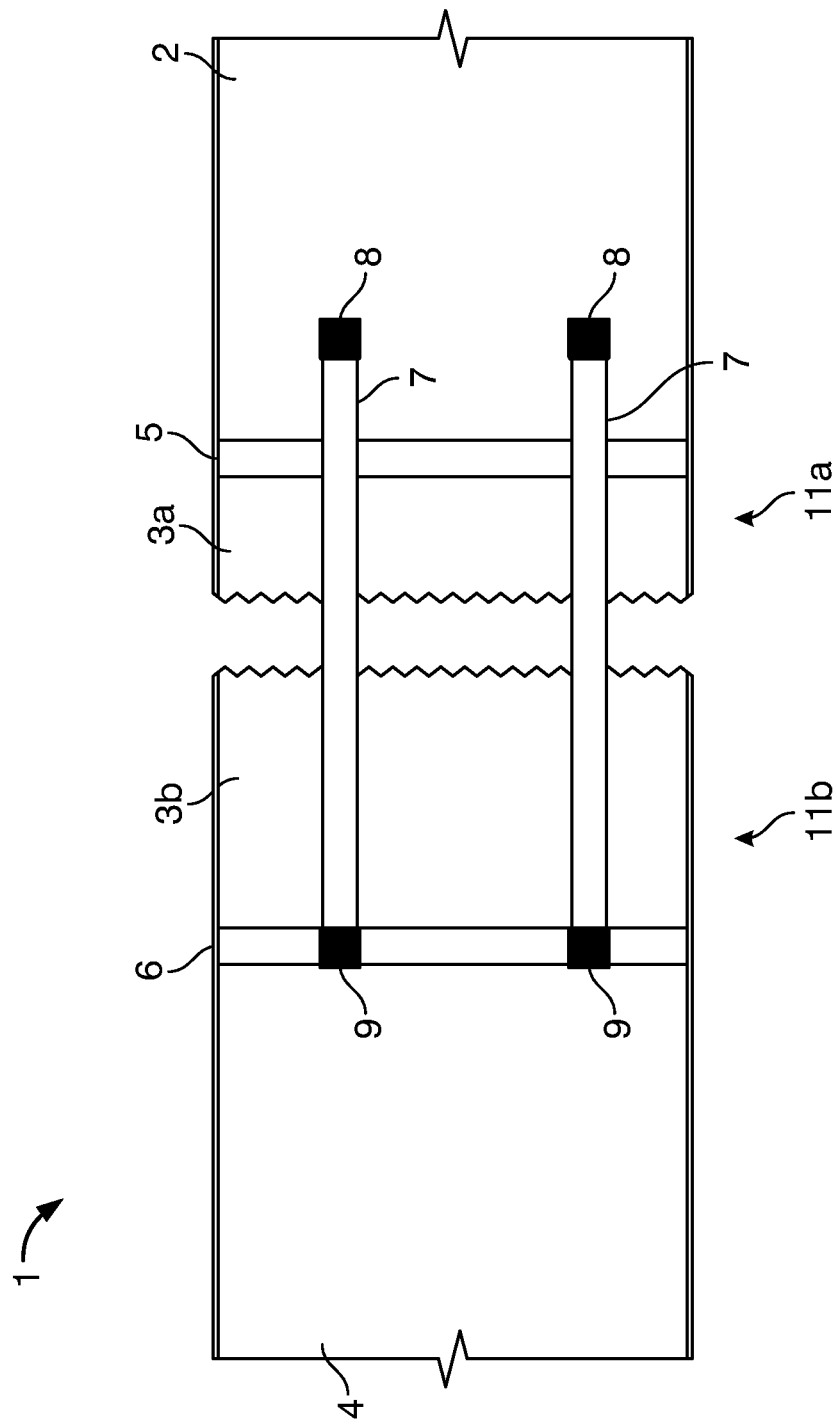
FIG. 3 is a top view of a first embodiment of a pipe liner in accordance with the present invention.

FIG. 3 illustrates a top view of the pipe liner 1, wherein the deformation portion 10 has been ruptured by the application of a tensile force to the connector tube 3, transmitted by the user to the connector tube 3 via the extender tube 2. As the deformation portion 10 is exposed to this stress, it begins to deform and rupture, resulting in the connector tube breaking into two sections 3*a*, 3*b* such that the pipe liner 1 is no longer a continuously tubular construction. Instead, the pipe liner 1 now comprises a first tubular construction 11*a*, and a second tubular construction 11*b*, connected by the load transfer members 7.

Each of these tubular constructions 11*a*, 11*b* may move in relation to one another, but only within the limits defined by the load transfer members 7. It is the length of the load transfer members 7 that sets the extent to which the tubular constructions 11*a*, 11*b* may be separated, the load transfer members 7 becoming taut as the first tubular construction 11*a* is moved away from the second tubular construction 11*b*, preventing any further separation.

Figure 4:
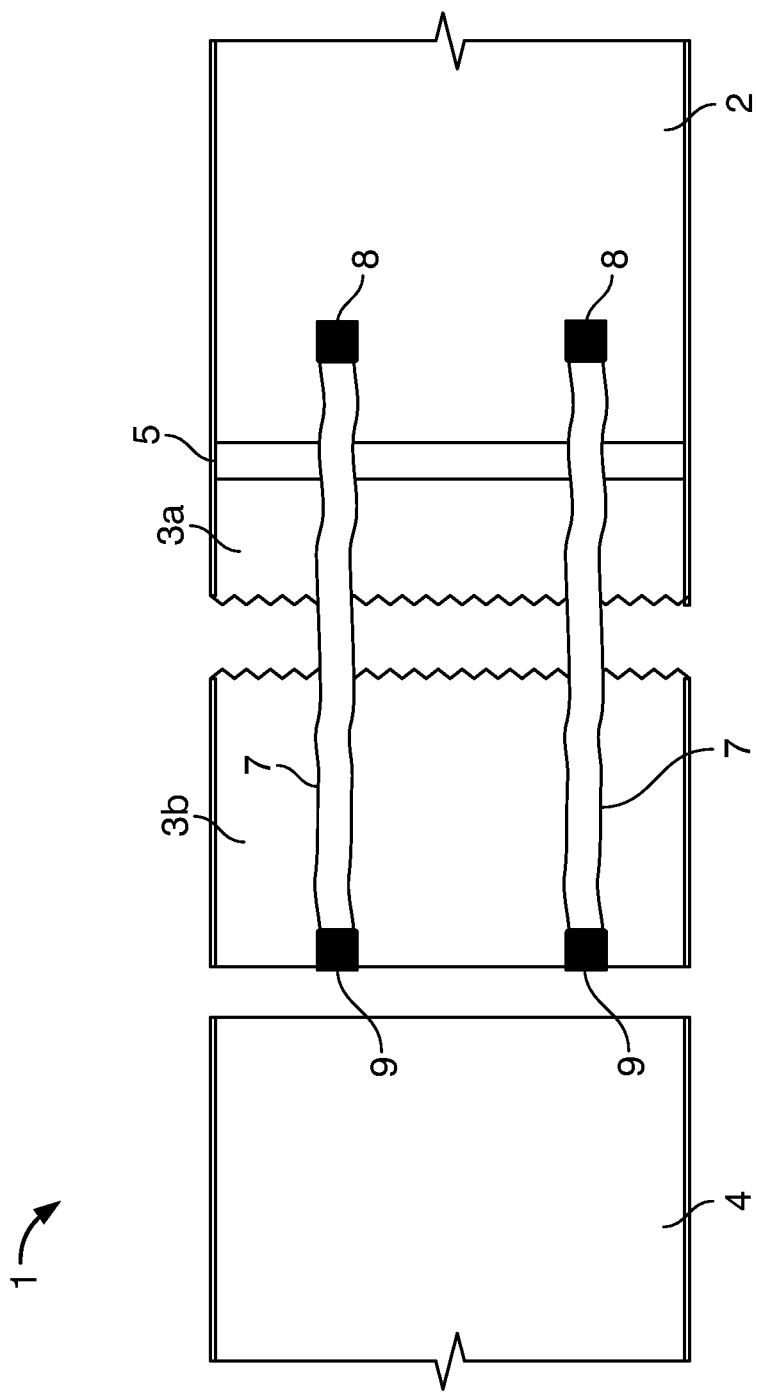
FIG. 4 is a top view of a first embodiment of a pipe liner in accordance with the present invention.

As the load transfer members 7 become taut, the tensile force applied by the user to the extender tube 2 is transferred through the first attachment points 8 and the inextensible load transfer members 7 to the second attachment points 9 and the second connection 6. The small size of the second attachment points 9 results in the tensile force being magnified in its intensity at each of the second attachment points 9, producing large loads at points around the second connection 6. These loads are significant enough that they overcome the strength of the adhesives used in the second connection 6, resulting in the separation of the second connection 6, and the second section of the connector tube 3*b* peeling away from the liner tube 4. Continued exertion of this tensile force by the user continues to peel the second section of the connector tube 3*b* away from the liner tube 4, until the two are completely separated, as seen in FIG. 4.

Subsequently, the user may detach the connector tube 3 from the extender tube 2 at the first connection 5, and detach the load transfer members 7 from the extender tube 2 at the first attachment points 8. In this way, the extender tube 2 may be reused to install another liner tube 4. To reuse the extender tube 2, the extender tube 2 is connected to an unused, complete connector tube 3', with a deformation portion that remains whole and undamaged. To form this connection, the replacement connector tube 3' is attached to the extender tube 2 at the first connection 5 using a reusable adhesive, the load transfer members 7 also connected to the extender tube 2 at the first attachment points 8 using a reusable adhesive.

Figure 5:
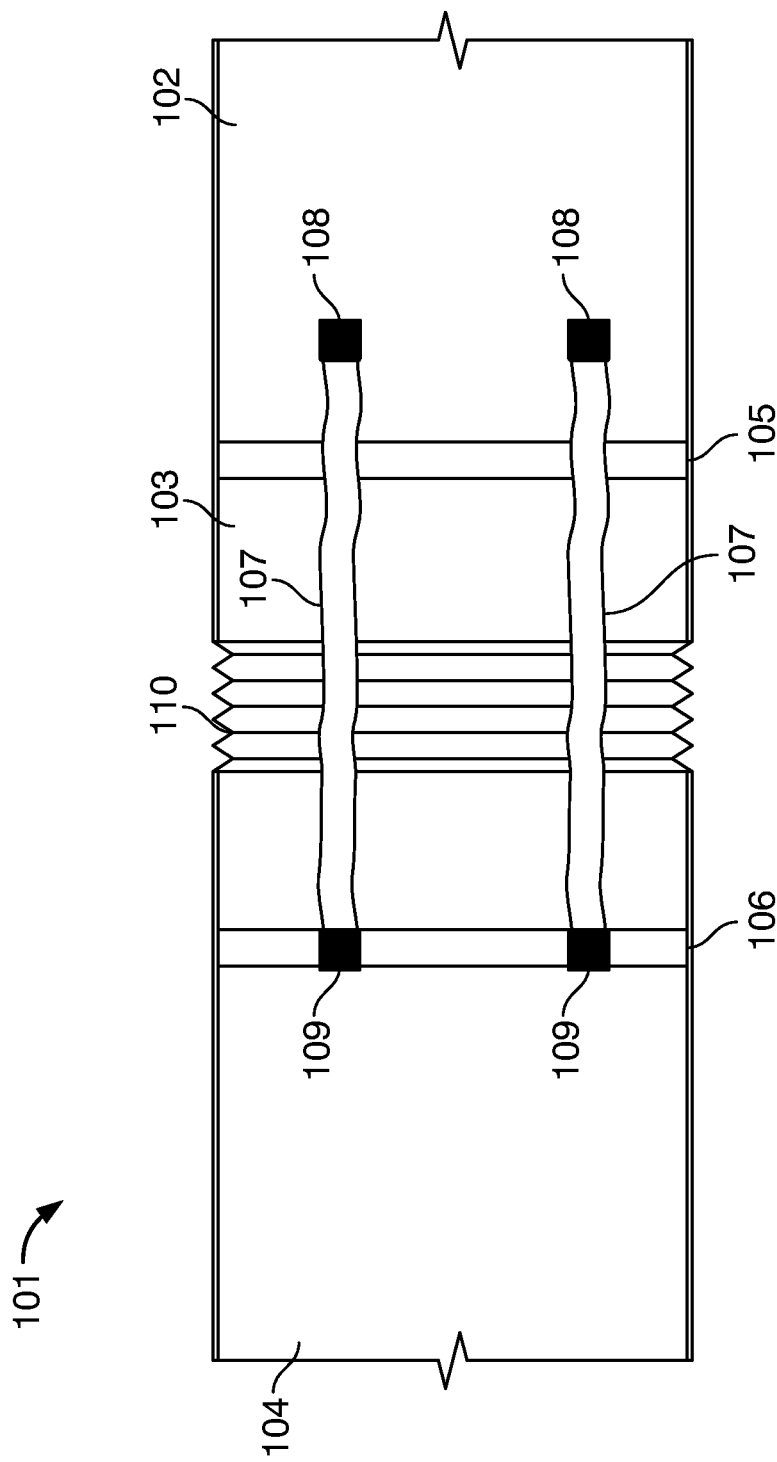
FIG. 5 is a top view of a second embodiment of a pipe liner in accordance with the present invention.

Referring to FIG. 5 of the drawings, there is shown the exterior of a pipe liner 101 in accordance with a second embodiment of the present invention. As in the first embodiment of the invention, this second embodiment comprises an extender tube 102, a connector tube 103, a liner tube 104, first and second connections 105, 106, load transfer members 107 as well as first and second attachment points 108, 109. In this embodiment of the invention, the deformation portion 110, comprises a compressed concertina which is extensible under a tensile load applied along the longitudinal axis of the pipe liner 101. The compressed concertina may be extended such that connector tube 103 extends in length under a tensile load until the load transfer members 107 become taut, transferring the load to the second attachment points 109 and the second connection 106, again resulting in the breaking, rupture or detachment of the second connection 106 to separate the connecter tube 103 from the liner tube 104. Again, the user may detach the connector tube 103 from the extender tube 102 at the first connection 105, and detach the load transfer members 107 from the extender tube 102 at the first attachment points 108 to allow the extender tube to be reused.

Figure 6:
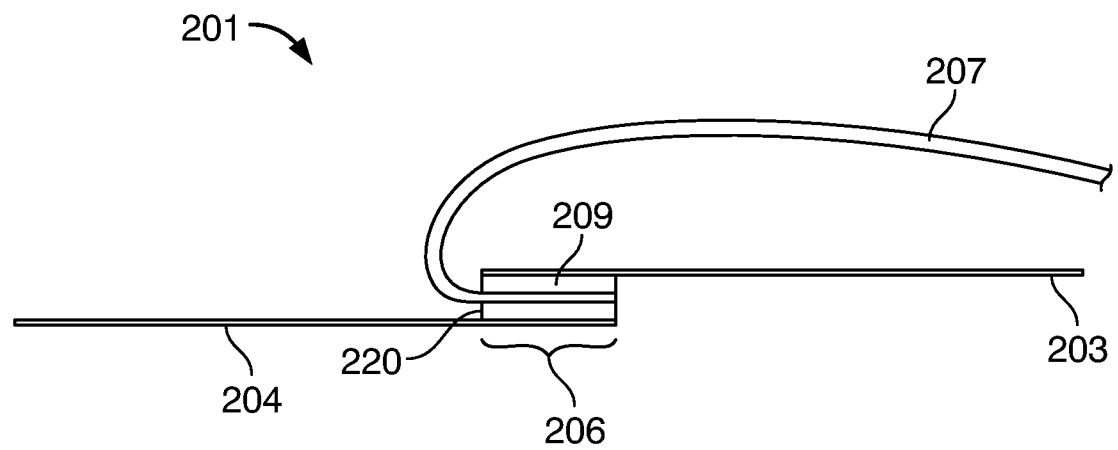
FIG. 6 is a longitudinal section of a pipe liner in accordance with a third embodiment of the present invention.

Referring to FIG. 6 of the drawings, there is shown a longitudinal section of a pipe liner 201 in accordance with a third embodiment of the present invention. In this embodiment of the invention, a second end of the connector tube 203 is attached to a first end of the liner tube 204 at a second connection 206, and the load transfer member 207 is attached to the connector tube 203 at a second attachment point 209 which is integrated with the second connection 206.

As seen in FIG. 6, the load transfer member 207 is sandwiched between the connector tube 203 and the liner tube 204, within the second connection 206. Welded material 220 surrounds all three of these elements of the pipe liner 201 to form a single connection. Any such weld may be a chemical weld formed with adhesive, or a heat weld formed after the application of increased temperature to the pipe liner. Additionally, the use of an adhesive that does not form a chemical weld is envisaged. Here, the load transfer member 207 loops around the end of the connector tube 203, increasing the peeling force exerted on the second connection 206 under a tensile load.

Figure 7:
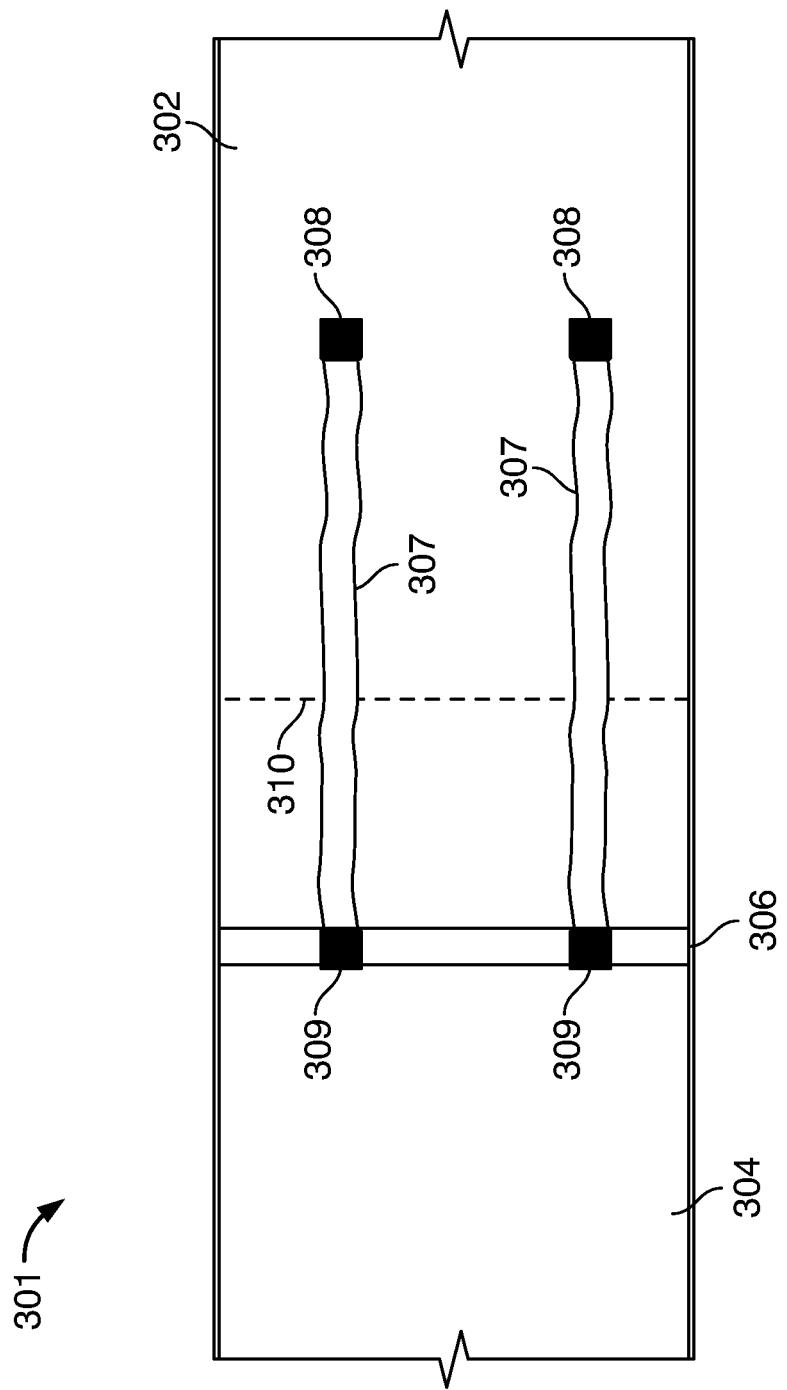
FIG. 7 is a top view of a third embodiment of a pipe liner in accordance with the present invention.

FIG. 7 illustrates a pipe liner 301 where re-use of the extender tube 302 is less of a concern. Here, the extender tube 302 is connected to a liner tube 304 at a detachable connection 306, wherein the detachable connection 306 forms a gas tight seal between the extender tube 302 and the liner tube 304. Load transfer members 307 are connected to the extender tube 302 at a first attachment point 308 and a second attachment point 309, the second attachment point 309 located closer to the detachable connection 306 than the first attachment point 308. Additionally, the extender tube includes a deformation portion 310 located between the first attachment point 308 and the second attachment point 309, the deformation portion forming a ring around the circumference of the extender tube 302.

During use, a tensile force will be applied along the longitudinal axis of the pipe liner 301, breaking the extender tube 302 in the area of the deformation portion 310. As a result, this tensile force will be transferred to the detachable connection 306 along taut load transfer members 307, and the detachable connection 305 will be separated leaving the liner tube 304 in place. If re-use of the extender tube 302 is required, the deformation portion may be reversibly extensible, rather than frangible.

Figure 8:
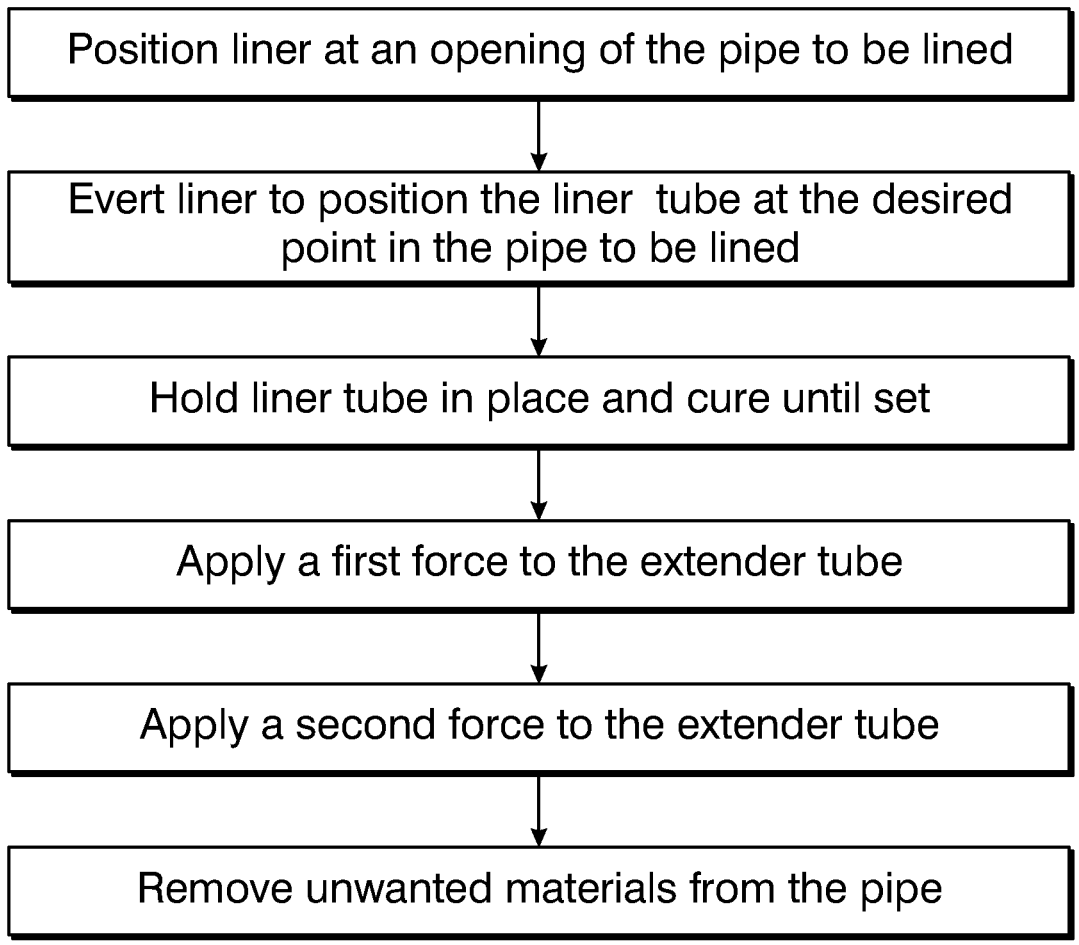
FIG. 8 is a flow chart detailing a method of lining a pipe.

FIG. 8 is a schematic detailing a method of lining a pipe according to the present invention. In this method, the combined extender tube, connector tube and liner tube are everted to position the liner tube at the desired position in a pipe to be lined. The liner is then held in place and cured. Subsequently, a first force is applied to the extender tube, the force passing along the extender tube resulting in the rupture, extension or breakage of the deformation portion. A second force is then applied and transmitted along the extender tube and the load transfer members to apply a force to the second attachment point, resulting in the second connection being broken, by rupture or peeling, and the connector tube becoming detached from the liner tube. Finally, the extender tube, connector tube and load transfer members are removed from the pipe.

Figure 9:
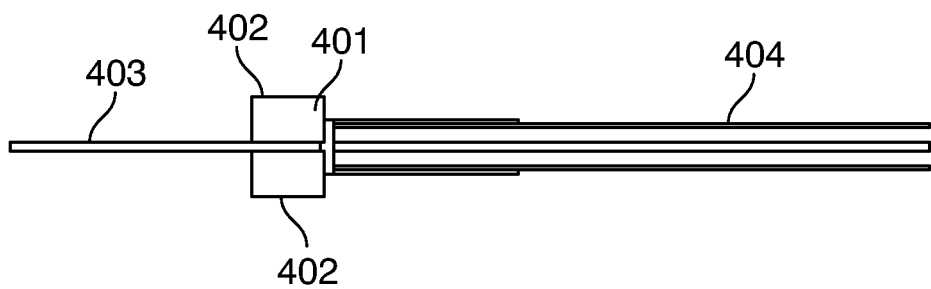
FIG. 9 is a side view of one end of a pipe liner in accordance with the present invention.

An additional sealing feature may be provided to prevent resin from flowing out of the end of the liner into the connector tube where it could compromise the detachment process. FIG. 9 shows in side view a clamp 401 comprising two bars 402 positioned one on each side of the connector tube 403 which is in lay-flat mode, adjacent to the end of the liner 404, the bars being forced together by tightening means, not shown in FIG. 9, such as screws or C-clips fitted to the ends of the bars, to provide a complete closure. As an additional precaution, the inner surface of the connector tube is preferably protected from resin adhering to it by a coating of a non-stick material such as a grease. Other forms or construction of a clamp or releasable sealing press may be provided.

The method of attaching and detaching one tube to and from another described in this invention is not limited in application to CIPP liners and may be used in other instances. In addition various modifications may be made to the described embodiment without departing from the scope of the present invention. The structure and orientation of the pipe liner may be of an alternative design or shaping or may be provided in part as a one piece design. The structure and orientation of the extender tube and connector tube of the pipe liner may be of an alternative design or shaping or may be provided in part as a one piece design. Any suitable material or construction may be used.

The invention claimed is:

1. A liner for insertion into a pipe, said liner comprising;
   an extender tube,
   a connector tube, and
   a liner tube,
   a first end of said extender tube forming a substantially fluid tight connection with a first end of said connector tube to form a first connection,
   a second end of said connector tube forming a substantially fluid tight, detachable connection with a first end of said liner tube to form a second connection, said extender tube, connector tube and liner tube forming a continuous tubular construction which is capable of eversion,
   wherein said liner further comprises at least one load transfer member, a first end of said load transfer member attached to said extender tube at a first attachment point,
   a second end of said load transfer member attached to said connector tube at a second attachment point,
   wherein said connector tube further comprises a deformation portion located between said first connection and said second attachment point and wherein said deformation portion is frangible.

2. A liner according to claim 1, wherein said deformation portion is extensible.

3. A liner according to claim 1, wherein said deformation portion forms annulus around the circumference of the connector tube.

4. A liner according to claim 1, wherein said second attachment point is proximate said second connection.

5. A liner according to claim 1, wherein said second attachment point is integrated within said second connection.

6. A liner according to claim 1, wherein said load transfer member has a length greater than the distance between said first attachment point and said second attachment point.

7. A liner according to claim 1, wherein said first attachment point is located proximal to said first connection.

8. A liner according to claim 1, wherein said load transfer member is flexible.

9. A liner according to claim 1, wherein said load transfer member is inextensible.

10. A liner according to claim 1, wherein said first connection is detachable.

11. A liner according to claim 10, wherein said connector tube is attached to said extender tube at said first connection with a reusable adhesive.

12. A liner according to claim 1, wherein the attachment between said load transfer member and said extender tube at said first attachment point is frangible.

13. A method of lining a pipe using the apparatus of claim 1, comprising everting the combined extender tube, connector tube and liner tube such that said liner tube becomes positioned at a desired position in a pipe being lined,
   applying a first force to said extender tube, said first force transmitted along said extender tube to deform the deformation portion,
   applying a second force to said extender tube, said second force transmitted along said extender tube and along at least one load transfer member to the second attachment point,
   detaching said connector tube from said liner tube at the second connection using said second force, and removing said extender tube, said connector tube and said load transfer member from the pipe.

14. The method of claim 13, wherein the combined extender tube, connector tube and liner tube are everted using fluid under pressure.

15. The method of claim 13, wherein the application of said first force extends continuously into the application of said second force.

16. The method of claim 13, wherein said first force places said deformation portion under tensile stress.

17. The method of claim 13, wherein said second force places said load transfer member under tensile stress.

18. The method of claim 13, wherein said second force exerts a peeling force on said second connection.

19. The method of claim 13, further comprising the step of curing the liner tube.

20. A liner for insertion into a pipe, said liner comprising;
an extender tube, and
a liner tube,
a first end of said extender tube forming a substantially fluid tight seal with a first end of a connector tube to form a frangible connection,
said extender tube and said liner tube forming a continuous tubular construction which is capable of eversion,
wherein said liner further comprises at least one load transfer member, a first end of said load transfer member attached to said extender tube at a first attachment point,
a second end of said load transfer member attached to said extender tube at a second attachment point,
said second attachment point being closer to said frangible connection than said first attachment point,
wherein said extender tube further comprises a deformation portion located between said first attachment point and said second attachment point and wherein said deformation portion is frangible.

21. A liner according to claim 20, wherein said deformation portion is extensible.

22. A liner according to claim 20, wherein said deformation portion forms an annulus around the circumference of the extender tube.

23. A liner according to claim 20, wherein said second attachment point is integrated within said frangible connection.

24. A liner according to claim 20, wherein said load transfer member has a length greater than the distance between said first attachment point and said second attachment point.

25. A liner according to claim 20, wherein said load transfer member is flexible.

26. A liner according to claim 20, wherein said load transfer member is inextensible.

27. A method of lining a pipe using the apparatus of claim 20, comprising
everting the combined extender tube and liner tube such that said liner tube becomes positioned at a desired position in a pipe being lined,
applying a first force to said extender tube, said first force transmitted along said extender tube to deform the deformation portion,
applying a second force to said extender tube, said second force transmitted along said extender tube and along at least one load transfer member to the second attachment point,
detaching said extender tube from said liner tube at the frangible connection using said second force, and
removing said extender tube and said load transfer member from the pipe.

28. The method of claim 27, wherein the combined extender tube and liner tube are everted using fluid under pressure.

29. The method of claim 27, wherein the application of said first force extends continuously into the application of said second force.

30. The method of claim 27, wherein said first force places said deformation portion under tensile stress.

31. The method of claim 27, wherein said second force places said load transfer member under tensile stress.

32. The method of claim 27, wherein said second force exerts a peeling force on said frangible connection.

33. The method of claim 27, further comprising the step of curing the liner tube.

34. A connector tube which is capable of eversion, comprising
a first end for forming a first fluid tight connection with a second tube,
a second end for forming a second fluid tight connection with a third tube, said connector tube further comprising at least one load transfer member, a first end of said load transfer member attached to said connector tube at a first attachment point,
said connector tube further comprising a deformation portion, wherein said deformation portion is frangible.

* * * * *

UNITED STATES PATENT AND TRADEMARK OFFICE
CERTIFICATE OF CORRECTION

PATENT NO. : 10,876,671 B2  
APPLICATION NO. : 16/304648  
DATED : December 29, 2020  
INVENTOR(S) : Simon Sanders Page 1 of 1

It is certified that error appears in the above-identified patent and that said Letters Patent is hereby corrected as shown below:

On the Title Page

(54) Title and in the Specification, Column 1, Line 1, Replace "LINER" with --A LINER--

Signed and Sealed this
Eleventh Day of October, 2022

Katherine Kelly Vidal
*Director of the United States Patent and Trademark Office*